United States Patent [19]
Festa

[11] 3,880,109
[45] Apr. 29, 1975

[54] FUEL DELIVERY DETECTOR
[75] Inventor: Albert P. Festa, Brooklyn, N.Y.
[73] Assignee: The Raymond Lee Organization, Inc., New York, N.Y. ; a part interest
[22] Filed: Feb. 28, 1974
[21] Appl. No.: 446,686

[52] U.S. Cl. .............................. 116/114 R; 73/312
[51] Int. Cl. .............................................. G01f 23/08
[58] Field of Search ..... 116/114 R; 346/17; 73/312, 73/308

[56] References Cited
UNITED STATES PATENTS

| 419,967 | 1/1890 | McDonald | 73/308 |
| 1,008,446 | 11/1911 | Butts | 73/312 |
| 1,136,576 | 4/1915 | Wolf | 73/312 |
| 1,922,362 | 8/1933 | Halversen | 73/312 |

Primary Examiner—Richard C. Queisser
Assistant Examiner—Denis E. Corr
Attorney, Agent, or Firm—Howard I. Podell

[57] ABSTRACT

An apparatus for indicating the prior minimum level of fuel in an oil fuel tank after the tank has been refilled. A float system contained within the fuel tank is mechanically connected to a marker which draws a vertical line on a graduated changeable paper tab fitted to the exterior of the tank. The marked line permanently indicates the minimum fluid level in the tank prior to filling and serves to verify the amount of fuel subsequently added to the tank. Alternately, the float is linked to the indicator so as to move the indicator only in the direction of decreasing indication, with the indicator frictionally engaged to rest at the minimum level reached, when the float rises after the tank is refilled.

2 Claims, 3 Drawing Figures

PATENTED APR 29 1975  3,880,109
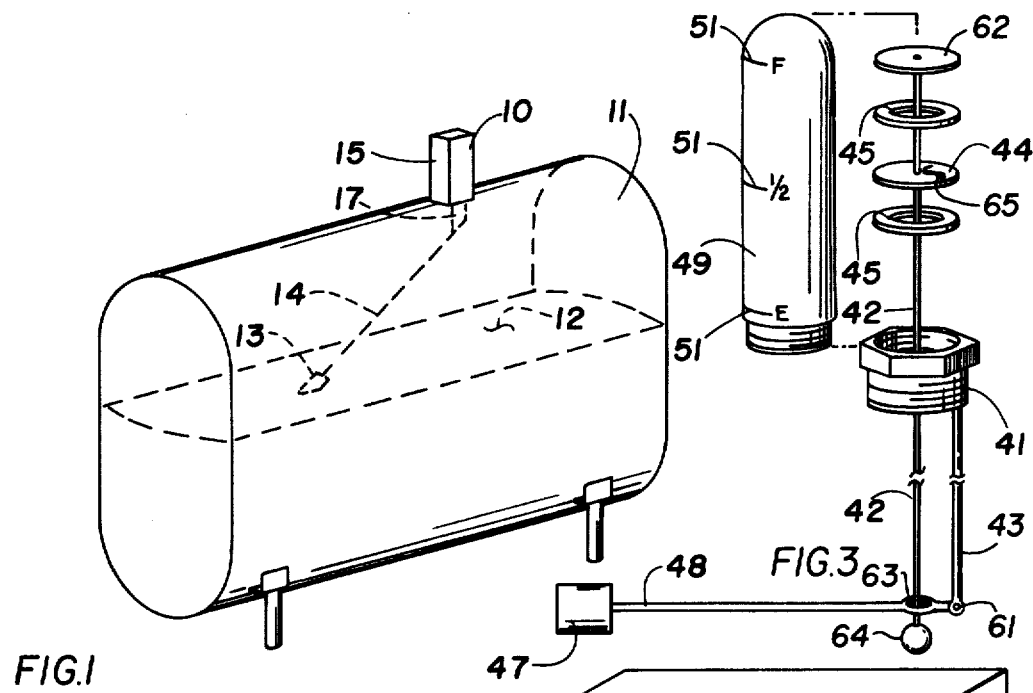
FIG.1
FIG.3
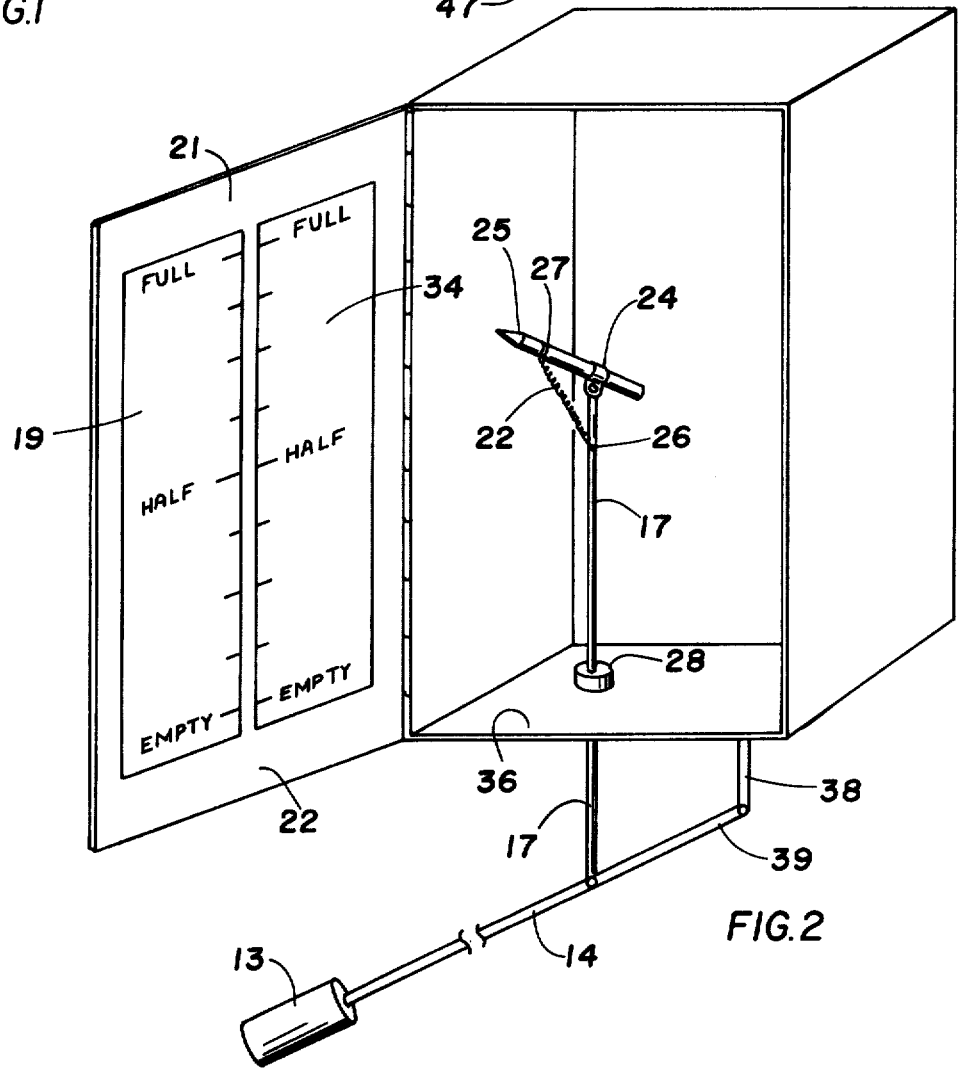
FIG.2

3,880,109

FUEL DELIVERY DETECTOR

SUMMARY OF THE INVENTION

My invention relates to a level indicator system for a fuel or oil tank.

A float system contained within an oil tank is mechanically connected to a marking pen fitted on the exterior of the tank. The pen marks its position on a changeable graduated tab of paper.

A major advantage of my invention is that it provides a method of verifying the consumption of fuel oil utilized from the attached tank, since the tab permanently indicates the level of fuel that was in the tank prior to the tank being refilled and also indicates the maximum level in the tank after refilling.

BRIEF DESCRIPTION OF THE DRAWING

The objects and features of the invention may be understood with reference to the following detailed description of an illustrative embodiment of the invention, taken together with the accompanying drawing in which:

FIG. 1 illustrates a perspective view of a fuel tank in which the device is installed;

FIG. 2 illustrates a perspective view of the cabinet containing the marking pen and float; and FIG. 3 illustrates an exploded perspective view of an alternate embodiment of the device.

DESCRIPTION OF THE PREFERRED EMBODIMENT

Turning now descriptively to the drawing, in which similar reference characters denote similar elements throughout the several views, FIGS. 1-2 show the device 10 installed in a conventional oil fuel tank 11 containing fuel oil 12. A rectangular cabinet 15 with a hinged door 21 is mounted on top of tank 11. On the inside surface 22 of the hinged door 21 is mounted a graduated vertical metal tab plate 19 to which a replaceably paper tab 34 may be affixed. When the hinged door 21 is in a closed position, a marking pen 25 rests on the paper tab 34. Marking pen 25 is held against the paper tab 34 by tension spring 22 which is connected to shaft 17 at eye hook 26 and to the marking pen 25 by collar 27. Pen 25 is held in position by a collar 24 which is mounted at the end of shaft 17. Shaft 17 extends downward through gasketed hole 28 below bottom base 36 of the rectangular cabinet 15 into the oil tank 11.

Metal rod 14 in tank 11 is loosely linked to vertical shaft 17. One end of rod 14 is fitted with a float for riding on the surface of the oil 12 and the other end 39 of rod 14 is rotatably fixed to fixed arm 38 below cabinet base 36.

Vertical movement of float 13 consequently causes marking pen 25 to mark paper tab 34 with the indicated fuel level.

In use, a new paper tab 34 is inserted prior to an anticipated fuel delivery and the marking pen 25 continuously marks the tank level prior to and after the fuel delivery, thus recording the minimum and maximum fuel levels in the tank 11 and serving to verify the fuel delivery invoice.

An alternate embodiment of the device 40 is shown in FIG. 3. Float 47 is fastened to arm 48 that is rotatably pinned by pin 61 to vertical shaft 43 which is fixed to the male threaded fitting 41. Fitting 41 is fastened to a female threaded collar in the top of the wall of tank 11, with float 47 and arm 48 rotating in response to the level of oil 12 in said tank about pin 61. Shaft 42 is fixed to indicator 62, and loosely fits through eye 63 of arm 48 terminating at its lower end in a ball 64. Ball 64 is of larger diameter than the diameter of eye 63.

A perforated disc 44 is fitted about shaft 42 of a diameter to fit within fitting 41 and to be held in place by transparent housing 49 is threaded into place in fitting 41. A flat spring 65 is fixed to disc 44 to frictionally engage shaft 42 so that shaft 42 will move downwards only when ball 64 is engaged by eye 63 of arm 48 and arm 48 and float 47 are moving downwards in response to a reduction of oil level in the attached tank. Spring 65 permits manual readjustment of the position of shaft 42 and attached indicator 62 when housing 49 is unthreaded from fitting 41.

A pair of sealing gasket washers 45 are mounted about the disk 44 to provide a seal when housing 49 is installed in fitting 41.

Transparent enclosure 49 is embossed with markings 51 corresponding to fuel tank levels.

In operation, washers 45 are set close about disc 44 and the enclosure 49 fastened in place, with disc 44 seated in fitting 41 and indicator 62 indicating the existing fuel level.

As float 47 travels down in response to decreasing fuel tank level, indicator 62 is drawn downwards. When the attached tank is refilled, float 47 rises but indicator 62 remains at its minimum indicated setting, to indicate the tank level prior to refilling, until manually reset.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desired to secure by Letters Patent of the United States is:

1. An indicating mechanism for marking the fluid level of the fluid in a tank so as to indicate the minimum fluid level in the tank existing prior to subsequent fill of the tank and that may be set to indicate the actual level of the fluid in the tank after the tank has been filled, comprising a float attached to a float arm which is pivotably mounted on a fixed member located inside a tank for holding fluids, an indicator unit mounted on the exterior of the top of the tank, said indicator unit incorporating a vertical indicator shaft which extends from beyond the upper exterior of the tank into the interior of the tank, with the lower end of said shaft extending below the float arm, and with the lower interior end of the shaft fitted with means to loosely bear against the underside of the float arm when the float arm rests on said means, said vertical shaft mounted in a fitting fastened to the top of the tank, in slideable frictional engagement with said fitting, such that once the vertical shaft has been manually set to bear against the float arm, downward movement of the float arm responsive to a lowering of liquid level in the tank results in corresponding downward movement of the vertical shaft, while upward movement of the float arm, caused by filling of liquid into the tank, does not result in movement of the indicator shaft from its position prior to the filling of the liquid into the tank.

2. The combination as recited in claim 1 in which the indicator unit incorporates a transparent hollow housing detachably fastened to the fitting fastened to the top of the tank, said housing enclosing the section of the indicator shaft extending beyond the exterior of the tank.

* * * * *